(12) United States Patent
Haubmann

(10) Patent No.: US 8,068,168 B2
(45) Date of Patent: Nov. 29, 2011

(54) DEVICE FOR CONNECTING A CAMERA LENS TO A MOVIE CAMERA

(75) Inventor: Michael B. Haubmann, Vienna (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 796 days.

(21) Appl. No.: 10/590,639

(22) PCT Filed: Feb. 17, 2005

(86) PCT No.: PCT/DE2005/000306
§ 371 (c)(1),
(2), (4) Date: Aug. 28, 2008

(87) PCT Pub. No.: WO2005/083506
PCT Pub. Date: Sep. 9, 2005

(65) Prior Publication Data
US 2009/0051806 A1   Feb. 26, 2009

(30) Foreign Application Priority Data
Feb. 25, 2004 (DE) .................. 10-2004-009-856

(51) Int. Cl.
*H04N 5/225* (2006.01)
*G02B 13/16* (2006.01)
*G03B 17/00* (2006.01)
(52) U.S. Cl. ........ 348/360; 348/361; 348/335; 396/530; 396/529
(58) Field of Classification Search .......... 348/335–369; 396/529–533
See application file for complete search history.

(56) References Cited

U.S. PATENT DOCUMENTS

| 4,404,595 A | * | 9/1983 | Ushiro et al. ................. 348/357 |
| 4,627,699 A | * | 12/1986 | Takagi ............................ 396/89 |
| 4,682,871 A | | 7/1987 | Metabi |

(Continued)

FOREIGN PATENT DOCUMENTS

DE   199 14 208 A1   10/1999

(Continued)

OTHER PUBLICATIONS

International Search Report, Dated Jun. 24, 2005, corresponding to PCT/DE2005/000306.

(Continued)

*Primary Examiner* — Sinh Tran
*Assistant Examiner* — Christopher K Peterson
(74) *Attorney, Agent, or Firm* — Christie, Parker & Hale LLP

(57) ABSTRACT

A device for connecting a camera lens to a movie camera has a camera housing with a lens mount and a device for acquiring data relating to the camera lens connected to the lens mount. Said device further comprising a miniaturized electronic system with data memory for storing data relating to the camera lens such as lens type, serial number, conversion tables and the like, and with a contact region that is arranged on a data interface between the lens mount of the movie camera and the lens fastening means of the camera lens and which is aligned with the contact region arranged in the lens mount of the movie camera is integrated in the lens fastening means of the camera lens or in a modified lens fastening means connected to the lens fastening means of the camera lens or replacing the latter.

10 Claims, 5 Drawing Sheets

U.S. PATENT DOCUMENTS

| | | | |
|---|---|---|---|
| 4,963,910 A | 10/1990 | Ishimura | |
| 5,257,058 A * | 10/1993 | Mabuchi | 396/71 |
| 6,097,511 A * | 8/2000 | Hirasawa et al. | 348/335 |
| 6,148,151 A | 11/2000 | Bauer | |
| 6,161,933 A | 12/2000 | Tschida et al. | |
| 6,742,943 B2 * | 6/2004 | Ushiro | 396/529 |
| 6,757,011 B1 | 6/2004 | Takeda et al. | |
| 6,930,721 B2 * | 8/2005 | Gelbard | 348/360 |
| 6,999,125 B2 * | 2/2006 | Fujiwara et al. | 348/362 |
| 2002/0130963 A1 * | 9/2002 | Gelbard | 348/360 |
| 2004/0202464 A1 * | 10/2004 | Miyasaka et al. | 396/529 |

FOREIGN PATENT DOCUMENTS

| | | |
|---|---|---|
| EP | 0 574 105 A1 | 12/1993 |
| EP | 0 910 814 B1 | 4/1999 |
| EP | 0 942 305 A1 | 9/1999 |

OTHER PUBLICATIONS

Arriflex 435 Advanced, Arri Arnold & Richter Cinetechnik, München, Jun. 14, 2002, 8 sheets, presented in Arrinews May 2001 (appeared in print at NAB Exhibition in Apr. 2001).

* cited by examiner

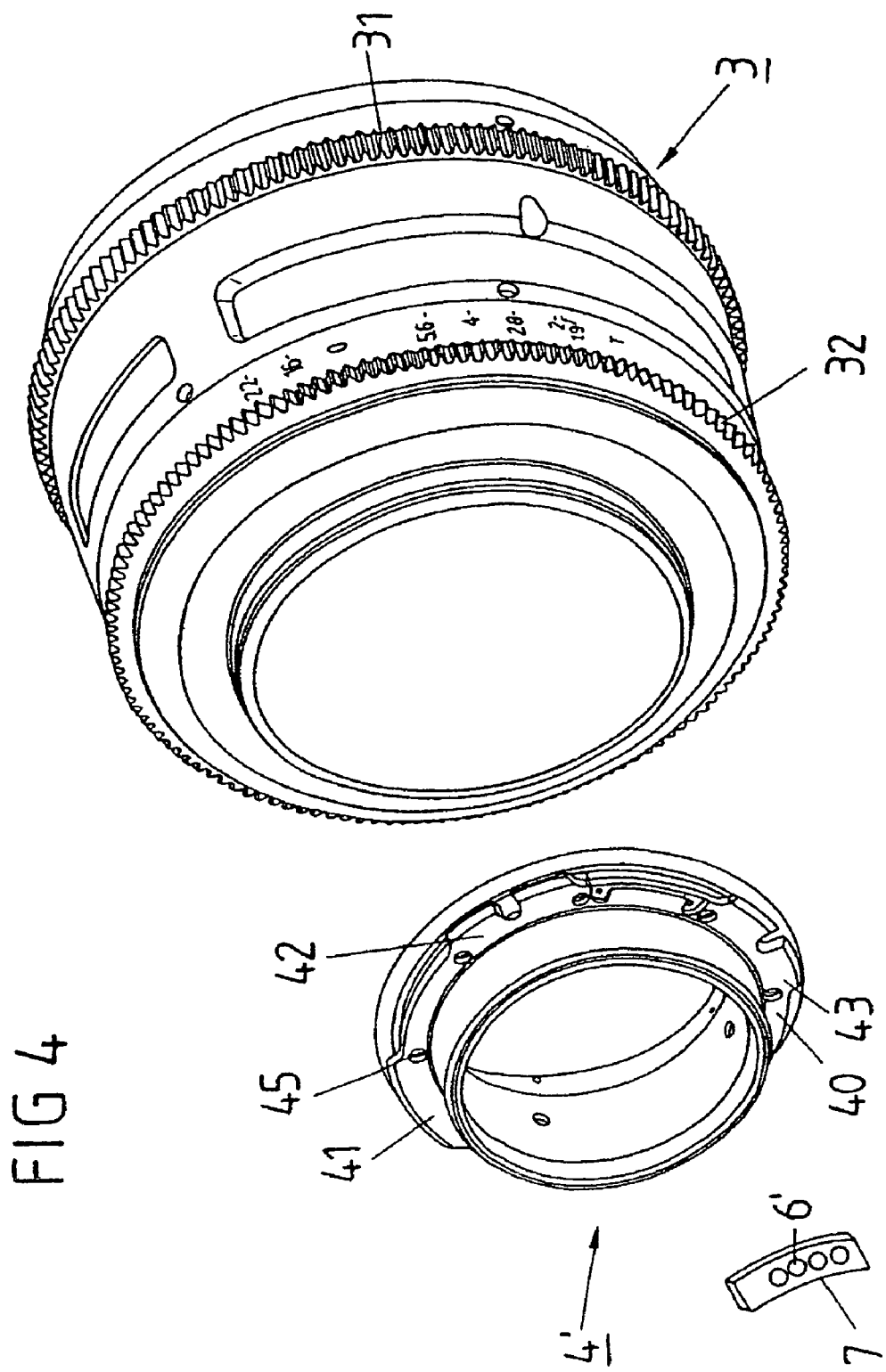

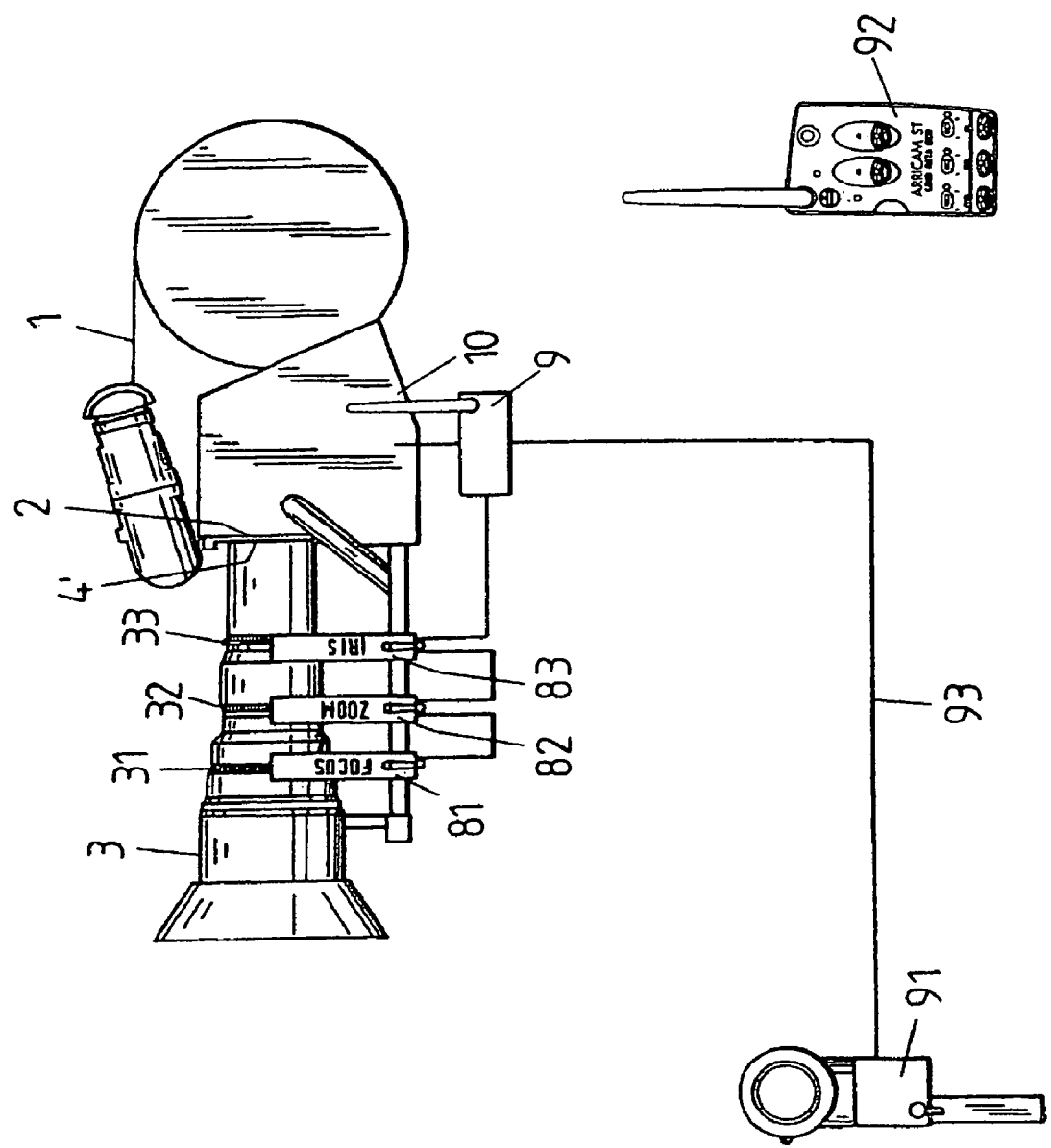

DEVICE FOR CONNECTING A CAMERA LENS TO A MOVIE CAMERA

CROSS-REFERENCE TO A RELATED APPLICATION

This application is a National Phase Patent Application of International Patent Application Number PCT/DE2005/000306, filed on Feb. 17, 2005, which claims priority of German Patent Application Number 10 2004 009 856.5, filed on Feb. 25, 2004.

BACKGROUND

The invention relates to a device for connecting a camera lens to a movie camera.

EP 0 942 305 A1 discloses a control system for a camera lens that is fastened on a lens mount of a movie camera with the aid of its lens fastening means. The control system includes a number of drive units for automatically setting desired positions of three lens rings via which the picture definition (focus), the shutter aperture of the iris diaphragm and the focal length (zoom) of the camera lens can be set. The lens rings are provided with an apparatus for determining the actual state of the positions of the lens ring, which determines the actual position of the lens rings relative to the camera lens, converts them into output measurement signals and, in particular, is designed in a contactless fashion as an optoelectronic angle sensor with a coding disk that is connected fixedly in terms of rotation to the respective lens ring and has a number of coding tracks and optotransmitters and optoreceivers arranged on both sides of the coding disk, or is designed as a magnetoresistive magnetic sensor and is integrated in the camera lens.

Transmitting the determined actual states of the lens ring positions to the movie camera via a standardized electric interface with a standardized lens fastening means and a standardized lens mount (PL mount) is known from the company publication "ARRIFLEX 435 ADVANCED" of Arnold & Richter Cinetechnik.

For the purpose of processing the acquired actual state of the lens ring positions and thus of the values, set at the camera lens, for the focus, the iris setting and the zoom, as well as of inputting desired values and outputting control commands to the drive units that can be coupled to the lens rings, EP 0 574 105 A1 discloses a modular control system for a movie camera in the case of which a control and regulation part with a position encoder is integrated in each drive unit and is connected via a digital data input and data output as well as a serial control and data bus to a manual control unit that has a memory module for recording setting values for prescribable camera and lens functions, such as shooting frequency, focal length, range, shutter, zone boundaries and scaling, as well as adjustment profiles of the frequency, zoom, focus and/or iris settings, in which setting values or adjustment profiles can be read, and from which they can be read out for a reproduction sequence or to restore previously noted settings.

Instead of a serial control and data bus for connecting the drive units and position sensors, which are coupled to the lens rings, to the manual control units for the purpose of inputting desired values, it is possible, in accordance with EP 0 910 814 B1 for a camera-side control and data acquisition unit that is electrically connected to a number of devices that control and detect camera and/or recording functions to be connected via a bidirectional radiotransceiver unit to operator-side control units for inputting control data and transmitting control signals for the purpose of controlling the camera and/or recording functions and thus also for setting a camera lens.

Since the application of the control system known from EP 0 942 305 A1 for a camera lens of a movie camera requires a camera lens with an integrated data memory and position sensors for detecting the actual states of the zoom, focus and iris settings of the camera lens, and a corresponding evaluation of the actual states and a standardized electric interface with a standardized lens fastening means and a standardized lens mount (PL mount) of the movie camera, camera lenses without these position sensors and data memory integrated in the camera lens cannot be used to the full extent for the control system, and so they remain capable of only limited application to control systems such as are known from EP 0 574 105 A1 and EP 0 910 814 B1 in the case of which the actual values of the lens settings are detected via the drive units that can be pivoted on the lens rings of the camera lens and include position sensors, and are processed in the control and regulating units together with the prescribed desired values.

SUMMARY

It is an object of the present invention to specify a device for connecting a camera lens to a movie camera of the type mentioned at the beginning with the aid of which it is also possible for camera lenses without integrated data memories, integrated position sensors and a standardized electric interface to be inserted into a control system for automatically setting values of a camera lens.

The solution according to the invention permits camera lenses without integrated data memories, integrated position sensors and a standardized electric interface also to be inserted into a control system for automatically setting values of a camera lens connected to a movie camera.

The solution according to the invention is based on the consideration of being able to insert camera lenses without integrated position sensors, data memories with stored, optics-related data of the camera lens and a standardized electric interface into a control system for a camera lens connected to a movie camera that reads out the optics-related data of the camera lens such as lens type, serial numbers, conversion tables and the like from the data memory via a standardized electric interface subsequently installed in the lens fastening means or additionally fitted on the lens fastening means, and processes them, and thereby enables the depth of field, for example, to be controlled in a fashion individually tuned to the respective camera lens. In principle, these optics-related data could also be related via a data record provided, for example, as bar code on a lens cover and be processed in the control system, but such a solution would require the use of additional reader units that would need to be connected to the control system for the camera lens. In addition to a complicated handling, there is also the risk that the lens cover containing the data record could be lost or inadvertently be exchanged for the lens cover of another camera lens.

The data memory for storing the data relating to the camera lens is preferably part of a miniaturized electronic system having a data store and a contact region which is arranged at the data interface and is aligned with the contact region arranged in the lens mount of the movie camera.

The integration of the data memory in a miniaturized electronic system enables the device for storing data relating to the camera lens to be integrated without any problem in a correspondingly modified lens fastening means such that the latter can be fitted on a standardized lens mount, designed as a PL mount, of a movie camera.

An alternative to integrating the data memory for storing the data relating to the camera lens or to the miniaturized electronic system in the original lens fastening means of the camera lens, the data memory or the miniaturized electronic system can be integrated in a modified lens fastening means that is to be connected to the lens fastening means of the camera lens or is to replace the latter.

It is ensured in the case of both variants that the individual, optics-related data of the relevant camera lens can be connected inseparably to the camera lens and read out via the standardized electric interface and processed by the control system for the camera lenses.

For camera lenses in which a standardized lens fastening means (PL mount) is not flanged directly onto a nonstandardized lens fastening means, but via an intermediate flange (intermediate mount), the device for storing data of the relevant camera lens is preferably arranged in the intermediate flange.

In a further variant, the miniaturized electronic system with data memory and standardized electric interface can be designed as a circuit foil that is fitted on the lens fastening means of the camera lens such that the contact region, arranged on the standardized electric interface, of the miniaturized electronic system is aligned with the contact region arranged in the lens mount of the movie camera.

In addition to storing the optics-related data of the camera lens, and to a correspondingly designed standardized electric interface, the miniaturized electronic system can include a dedicated power supply device or device for voltage buffering.

Since the camera lens provided with a standardized lens fastening means for storing data of the camera lens has no integrated position sensors, in a further reaching configuration of the solution according to the invention, it is possible, for the purpose of completely integrating camera lenses retrofitted in such a way, to provide position sensors, that can be connected to the lens rings of the camera lens, in order to acquire setting values of the camera lens for zoom, focus and/or iris, and for outputting position signals to the control system for camera lenses.

Also possible in addition to pure position sensors is the arrangement of adjusting devices that can be connected to the lens rings of the camera lens for motorized adjustment of zoom, focus or iris settings of the camera lens as a function of desired values that are output by the control system for camera lenses.

The position sensors and/or adjusting devices preferably comprise drive units that can be pivoted on lens rings of the camera lens.

BRIEF DESCRIPTION OF THE DRAWINGS

Further advantages and features of the invention are to be explained in more detail with the aid of an exemplary embodiment illustrated in the figures, in which:

FIG. 4 shows an exploded illustration of the integration of a miniaturized electronic system in a nonstandardized lens fastening means of a camera lens, and the connection thereof to the camera lens.

FIG. 5 shows a schematic of a control system for camera lenses having a standardized or modified lens fastening means and a number of position detecting and drive units and manual control units.

DETAILED DESCRIPTION

Figure 1:
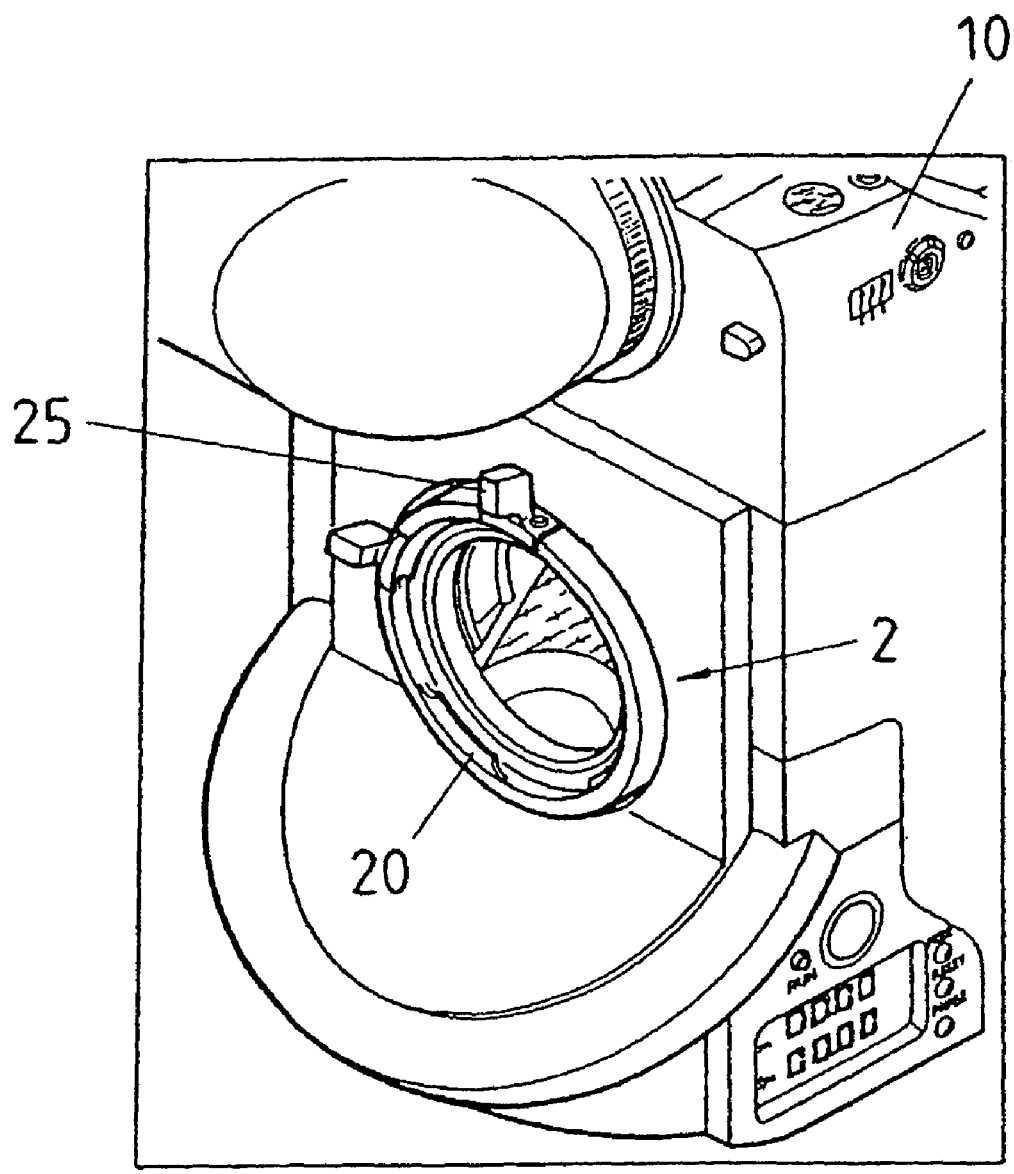
FIG. 1 shows a perspective schematic of the front housing part of a movie camera having a standardized lens mount.

The schematic front side view, illustrated in FIG. 1, of a movie camera 1 having a camera housing 10 shows a lens mount 2 for a camera lens, which is arranged on the front side of the camera housing 10 above a cover for a rotating mirror shutter. The lens mount 2 is designed for holding standardized lens fastening means, so-called PL mounts, and in the absence of a camera lens is connected to a cover cap that seals the opening into the interior of the movie camera 1.

The connection of the lens fastening means of a camera lens to the lens mount 2 is performed via a bayonet joint having a bayonet ring 20 that is actuated by means of a lever 25. If the lever 25 is pivoted in a counterclockwise fashion, the bayonet joint is opened for connecting the lens mount 2 to a cover cap or to a camera lens such that the cover cap or the camera lens can be removed from the movie camera 1.

Figure 2:
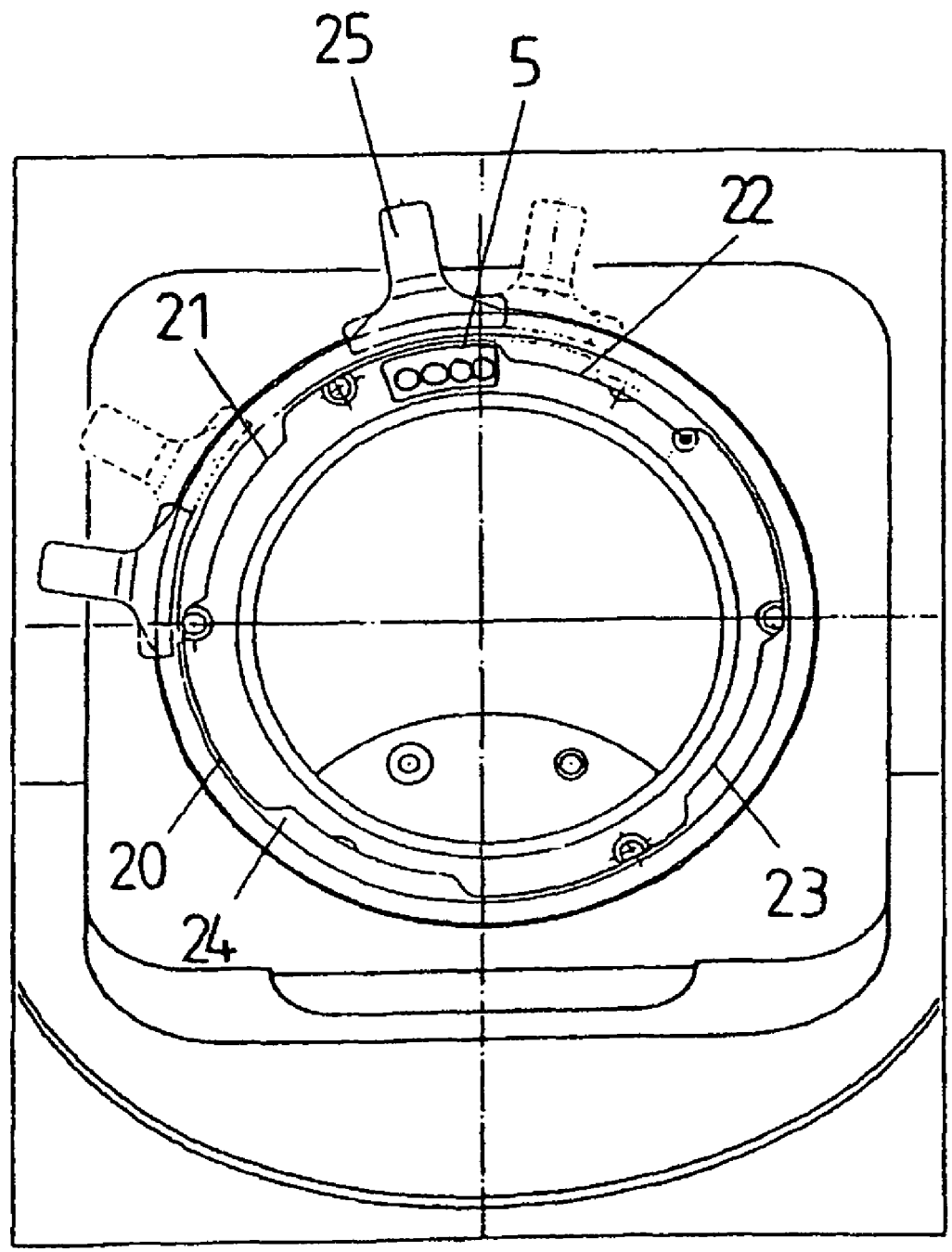
FIG. 2 shows a plan view of the standardized lens mount in accordance with FIG. 1.

In order to connect a camera lens to the camera mount 2, the camera fastening means of the camera lens is inserted into the opening of the lens mount 2, four grooves and webs 21 to 24 of the bayonet ring 20 that are arranged according to FIG. 2 in distributed fashion enabling the camera lens to be secured via bayonet connections arranged in distribution fashion. To lock and fasten the camera lens on the lens mount 2 of the movie camera 1, the hand lever 25 is pivoted in the clockwise sense such that the bayonet ring 20 is correspondingly also moved in the clockwise sense, and the connection between the camera lens and movie camera 1 is ensured.

The plan view, illustrated in FIG. 2, of the lens mount 2 on the front side of the camera housing 10 shows the four grooves and webs 21 to 24 of the bayonet ring 20 of the lens mount 2 that are arranged offset from one another by 90° in each case, as well as the lever 25, pivoted from the open to the closed position or from the closed position to the open position, of the lens ring 20 for fastening or releasing the lens fastening means of a camera lens.

Provided in the lens mount 2 as a standardized electric interface with a standardized lens fastening means of a camera lens having an integrated data memory and position sensors is a contact region 5 having in this exemplary embodiment four contacts that make contact with corresponding mating contacts on the standardized lens fastening means. The contacts of the contact region 5 are connected to a control and regulation device inside the camera or to an interface, arranged on the camera housing 10, for connecting the movie camera 1 to an external control system for camera lenses.

Figure 3:
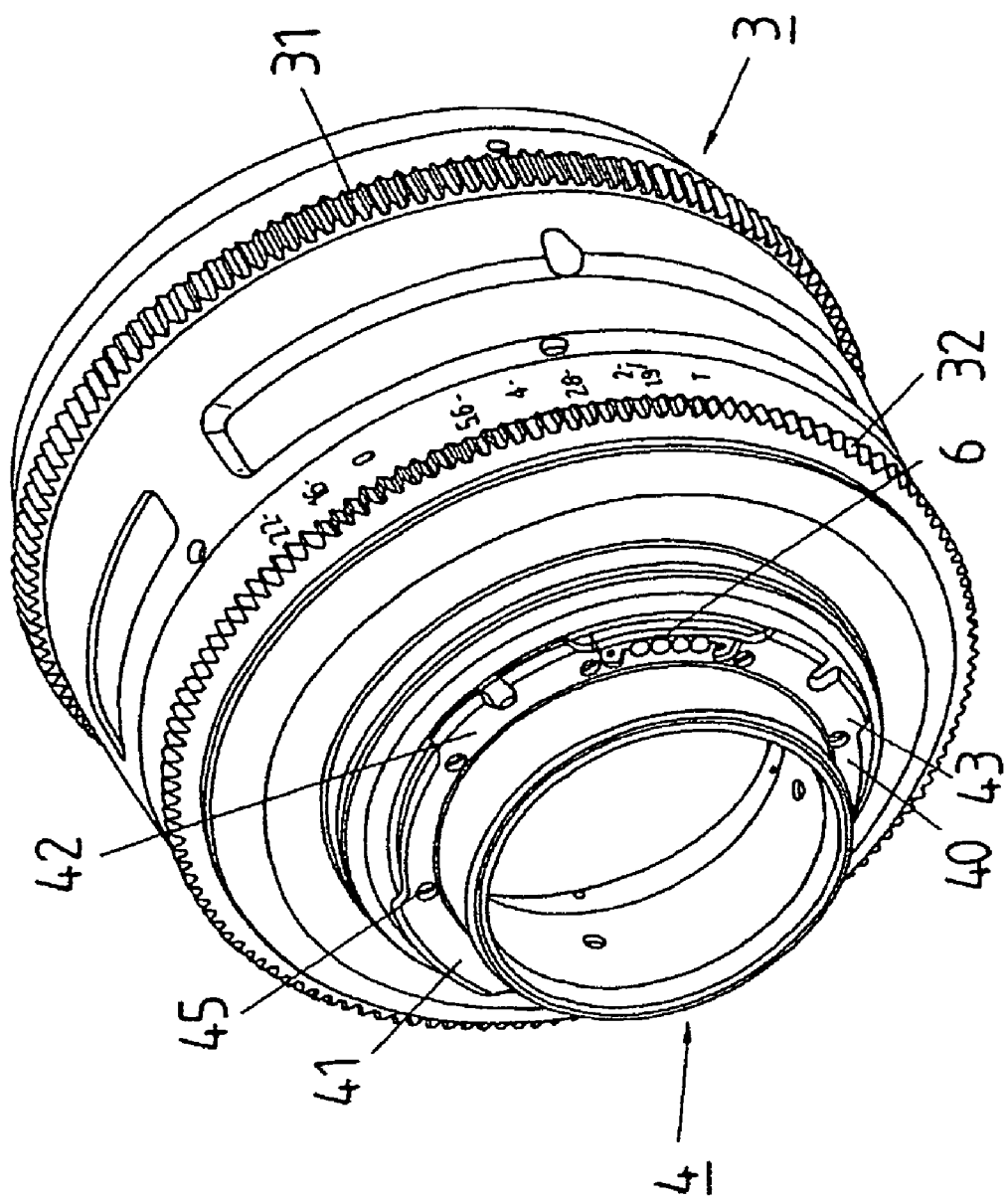
FIG. 3 shows a perspective schematic of a camera lens having a standardized or subsequently modified lens fastening means.

FIG. 3 shows a perspective schematic view of a camera lens 3 having a number of lens rings 31, 32 for setting the zoom, iris and/or focus, and a standardized or subsequently modified lens fastening means 4 that is to be connected to a standardized lens mount of a movie camera in accordance with FIGS. 1 and 2, and a standardized electric interface having a contact region 6 with four contacts that make contact with the four contacts of the contact region 5 of the lens mount 2 in accordance with FIG. 2 when the camera lens is mounted, and thereby make a connection either between the device for determining the actual state of the lens ring positions of a standardized camera lens, or the miniaturized electronic system having an integrated data memory of a lens fastening means subsequently modified according to the invention, and the control system for camera lenses.

In the case of a camera lens 3 that is not equipped with a standardized PL mount, the existing, non-standardized lens fastening means can be released by releasing the screw connections 45 of the camera lens 3, and can be replaced by a modified lens fastening system having a miniaturized electronic system with an integrated data memory and standardized electric interface.

The perspective view, shown in an exploded illustration in FIG. 4, of a camera lens 3 not equipped with a standardized PL mount shows how it is connected with a modified PL mount 4' into which a miniaturized electronic system 7 having an integrated data memory and a standardized electric interface with a contact region 6' having four contacts is inserted. The data memory of the miniaturized electronic system 7 contains optics-related data of the camera lens 3 such as lens type, serial number, conversion tables and the like, which can be read out via the contact of the standardized electric interface of the control system for camera lenses, which is integrated in the movie camera or is external.

In addition to a dedicated power supply device, the miniaturized electronic system 7 can include a processor that communicates with a corresponding processor of the control system for camera lenses via the data interface to the movie camera, and processes data that are read in or out, and stores them in the data memory of the miniaturized electronic system 7 and reads them out from the data memory thereof.

The modified PL mount 4' having a miniaturized electronic system 7 with an integrated data memory and a contact region 6' for a standardized electric interface can easily be provided for any desired camera lenses, and includes a bayonet ring 40 with bayonet webs 41 to 43 for connecting to the lens mount of a movie camera. The modified PL mount 4' is fastened on a camera lens 3 via screw connections 45, or is plugged onto a nonstandardized lens fastening means and connected to the latter. The miniaturized electronic system 7 optionally includes an integrated read only memory (ROM) that stores the optics-related data of the respective camera lens, or a data memory that can be programmed via an appropriate programming device with the optics-related data of the respective camera lens such that for different camera lenses there is a need only for a modified PL mount 4' that is connected to the respective lens fastening means of a camera lens 7 to be held in front.

The modified PL mount 4' can also comprise an intermediate flange when the camera lens 3 to be connected to the lens mount of the movie camera has a lens fastening means that is not flanged onto the lens mount directly, but via an intermediate flange. In this case, the intermediate flange fulfils the double function of a mechanical and electronic connecting link.

In a further alternative, a camera lens provided with a mechanically standardized lens fastening means can additionally be equipped with a device for storing data of the camera lens that comprises a miniaturized electronic system designed as a circuit foil and having a data memory and a standardized electric interface that is fitted on the lens fastening means of the camera lens, the contacts of the miniaturized electronic system that are arranged on the data interface being aligned with the contacts arranged in the lens mount of the movie camera.

Illustrated schematically in FIG. 5 is a control system for a camera lens 3 that is connected to a movie camera 1 via a lens mount 2 and includes three lens rings 31, 32, 33 for setting zoom, focus and iris. The control system is composed of a manual control unit 91 for setting zoom, focus and/or iris, a drive unit 81 for setting focus, a drive unit 82 for setting zoom, a drive unit 83 for setting iris, and a camera-side lens control unit 9 that is integrated in the movie camera 1 or is connected to a camera-side interface as an external device. The manual control unit 91 and the drive units 81, 82, 83 are interconnected via a serial control and data bus 93.

Via pinions, the drive units 81, 82, 83 respectively transmit a torque to the tooth wheels of the corresponding lens rings 31, 32, 33 of the camera lens 3 in accordance with desired values for setting zoom, focus and iris that are recorded or are set on the manual control unit 91 and transferred via the serial control and data bus 93.

The manual control unit 91 can comprise a main unit, for example a zoom main unit, onto which the focus/iris modules can be plugged via an extension plug, or to which they can be connected via cables, and is designed, in particular, as a handwheel unit respectively having a handwheel for setting zoom, focus and iris. In a way similar to the case of a mechanical sharp focus device, the handwheel here is designed with removable scale disks and displaceable, mechanically adjustable end stops. Both the zoom main unit and the focus/iris modules preferably have electronic displays for displaying the desired values for the drive units 81, 82, 83.

Instead of a manual control unit 91 connected via the serial control and data bus 93 to the drive units 81, 82, 83 and the camera side lens control unit 19, a control element 92 for setting zoom, focus and iris of the camera lens 3, and for setting camera functions can be connected in a wireless fashion via a radio-transceiver device to the camera side lens control unit 9, which likewise has a radiotransceiver device.

The camera lens 3 has a modified PL mount 4' having a miniaturized electronic system with a data memory that stores the optics-related data of the camera lens, and is connected to the lens mount 2 of the movie camera 1 via the modified PL mount 4'. The lens control 9 reads out the optics-related data of the camera lens 3 from the data memory of the miniaturized electronic system of the modified PL mount 4', and additionally receives actual state signals of the focus, zoom and iris settings from the position encoders or drive units 81, 82, 83 pivoted on the lens rings 31, 32, 33 of the camera lens 3. As a function of desired values, set at the manual control unit 91 or 92, for setting focus, zoom and iris, in the case of drive units 81, 82, 83 pivoted onto the lens length 91, 92, 93, the lens control unit 9 outputs actuating signals for setting focus, zoom and iris as a function of the optics-related data of the camera lens 3 that are read out from the data memory of the modified PL mount 4'.

Since the lens control unit 9 takes account of the optics-related data read out from the data memory of the modified PL mount 4', and thus of the lens specific parameters, it is possible, for example, to determine exactly the depth of field of the camera lens 3 such that sharp focusing can be undertaken within prescribed limits and the useful depth of field can be determined and, if appropriate, optically displayed.

The invention claimed is:
1. A movie camera assembly comprising:
    a camera lens with a non-standardized lens fastening means, without integrated data memories and without a standardized electric interface to be inserted into a control system;
    a movie camera having a camera housing with a lens mount and a device for acquiring data relating to the camera lens connected to the lens mount;
    an intermediate flange for connecting the camera lens to said lens mount of the movie camera;
    said intermediate flange comprising an electronic system which stores optics-related data of the camera lens;

said intermediate flange being connected to the camera lens on one side and to the lens mount of the movie camera on the other side;

said intermediate flange having a contact region, which is aligned with a contact region arranged in the lens mount of the movie camera for reading out said optics-related data of the camera lens by a control system for camera lenses integrated in the movie camera or an external control system for camera lenses.

2. The assembly of claim 1, wherein said intermediate flange includes a bayonet ring with bayonet webs for connecting to said lens mount of the movie camera.

3. The assembly of claim 2, wherein said intermediate flange is fastened on said camera lens via screw connections or is plugged onto and connected to said non-standardized lens fastening means.

4. The assembly of claim 1, wherein said intermediate flange is fastened on said camera lens via screw connections or is plugged onto and connected to said non-standardized lens fastening means.

5. The assembly of claim 1, wherein said electronic system for storing optics-related data of the camera lens is part of a miniaturized electronic system which comprises a standardized electric interface and is designed as a circuit foil that is fitted on the lens fastening means of the camera lens such that the contact region, arranged on the standardized electric interface, of the miniaturized electronic system is aligned with the contact region arranged in the lens mount of the movie camera.

6. The assembly of claim 1, wherein the miniaturized electronic system includes a power supply device and/or a voltage buffer.

7. The assembly of claim 1, wherein the miniaturized electronic system includes a processor for processing the data relating to the camera lens and to the position signals and/or the desired values output by the control system for camera lenses.

8. The assembly of claim 1, further comprising at least one position sensor, that can be connected to the camera lens for detecting lens settings such as zoom, focus or iris, and for outputting position signals to a control system for camera lenses.

9. The assembly of claim 1, further comprising at least one adjusting device, that can be connected to the camera lens for motorized adjustment of zoom, focus or iris settings of the camera lens as a function of desired values that are output by the control system for camera lenses.

10. The assembly of claim 1, wherein the position sensor or the adjusting device comprise drive units that can be pivoted on lens rings of the camera lens.

\* \* \* \* \*